(12) United States Patent
Chen et al.

(10) Patent No.: US 10,354,133 B2
(45) Date of Patent: Jul. 16, 2019

(54) METHOD FOR STRUCTURAL ANALYSIS AND RECOGNITION OF HANDWRITTEN MATHEMATICAL FORMULA IN NATURAL SCENE IMAGE

(71) Applicant: Beijing Lejent Technology Co., Ltd, Beijing (CN)

(72) Inventors: Lijiang Chen, Beijing (CN); Ning Liu, Beijing (CN); Hui Liu, Beijing (CN)

(73) Assignee: Beijing Lejent Technology Co., Ltd., Beijing (CN)

(*) Notice: Subject to any disclaimer, the term of this patent is extended or adjusted under 35 U.S.C. 154(b) by 98 days.

(21) Appl. No.: 15/531,088

(22) PCT Filed: Aug. 26, 2015

(86) PCT No.: PCT/CN2015/088113
§ 371 (c)(1),
(2) Date: May 26, 2017

(87) PCT Pub. No.: WO2017/031716
PCT Pub. Date: Mar. 2, 2017

(65) Prior Publication Data
US 2017/0337423 A1     Nov. 23, 2017

(51) Int. Cl.
*G06K 9/00*     (2006.01)
*G06N 3/02*     (2006.01)
(Continued)

(52) U.S. Cl.
CPC ....... *G06K 9/00429* (2013.01); *G06K 9/6212* (2013.01); *G06K 9/6269* (2013.01);
(Continued)

(58) Field of Classification Search
None
See application file for complete search history.

(56) References Cited

U.S. PATENT DOCUMENTS

2006/0062470 A1    3/2006   Zhu et al.
2009/0304282 A1*   12/2009   Predovic ............ G06K 9/00422
                                                                    382/187
(Continued)

FOREIGN PATENT DOCUMENTS

CN        102184399 A     9/2011
CN        102542273 A     7/2012
(Continued)

OTHER PUBLICATIONS

International Search Report dated Jun. 6, 2016 in corresponding Application No. PCT/CN2015/088113; 3 pgs.

*Primary Examiner* — Ryan P Potts
(74) *Attorney, Agent, or Firm* — Maier & Maier, PLLC

(57) ABSTRACT

The present method includes: transforming a gray matrix of a natural scene image into a local contrast matrix, and performing a binary division to the obtained local contrast matrix using an Otsu method, thereby obtaining a binary matrix; performing a connected domain analysis to the binary matrix, eliminating non-character connected domains to obtain character connected domains; performing a detection of elements of a special structure of a formula to the character connected domains using a correlation coefficient method, and separately annotating all the detected elements of the special structure: dividing rows of the binary matrix by means of horizontal projection; recognizing each character connected domain by means of a convolutional neural network; defining an output sequence, and outputting the results of recognition in a corresponding sequence according to a typesetting format of LaTeX.

10 Claims, 2 Drawing Sheets

(51) Int. Cl.
*G06K 9/62* (2006.01)
*G06N 3/04* (2006.01)
*G06K 9/72* (2006.01)
*G06F 17/12* (2006.01)
*G06K 9/38* (2006.01)
*G06K 9/46* (2006.01)

(52) U.S. Cl.
CPC .............. *G06K 9/726* (2013.01); *G06N 3/02* (2013.01); *G06N 3/04* (2013.01); *G06F 17/12* (2013.01); *G06K 9/38* (2013.01); *G06K 9/4638* (2013.01); *G06K 2209/01* (2013.01)

(56) References Cited

U.S. PATENT DOCUMENTS

| | | | | |
|---|---|---|---|---|
| 2011/0244434 A1* | 10/2011 | Livne | ............... | G09B 19/025 434/188 |
| 2012/0162107 A1* | 6/2012 | Yoshizawa | .......... | G06F 3/04883 345/173 |
| 2013/0205200 A1* | 8/2013 | Lazarevic | .......... | G06K 9/00463 715/244 |
| 2013/0226562 A1* | 8/2013 | Arnon | ............... | G06F 17/30831 704/9 |
| 2013/0268263 A1* | 10/2013 | Park | ...................... | G06F 17/215 704/9 |
| 2014/0006941 A1* | 1/2014 | Smirnova | ............. | G06F 17/214 715/268 |
| 2014/0301608 A1* | 10/2014 | Karthikeyan | ...... | G06K 9/00476 382/113 |
| 2015/0178250 A1* | 6/2015 | Huang | .................. | G06F 17/215 715/209 |

FOREIGN PATENT DOCUMENTS

| | | |
|---|---|---|
| CN | 103164701 A | 6/2013 |
| CN | 103810493 A | 5/2014 |
| CN | 103839058 A | 6/2014 |
| CN | 105184292 A | 12/2015 |

\* cited by examiner

METHOD FOR STRUCTURAL ANALYSIS AND RECOGNITION OF HANDWRITTEN MATHEMATICAL FORMULA IN NATURAL SCENE IMAGE

TECHNICAL FIELD

The present invention relates to the technology of image processing and pattern recognition, in particular to a method for structural analysis and recognition of a handwritten mathematical formula in a natural scene image.

BACKGROUND OF THE INVENTION

The OCR (Optical Character Recognition) technology has been widely applied and the OCR technologies for both Chinese and English have been well developed, but as far as a mathematical formula having a complicated structure is concerned, the present OCR technology cannot provide a good support, so the present invention aims at solving this problem to meet the application requirement.

SUMMARY OF THE INVENTION

The method for structural analysis and recognition of a handwritten mathematical formula in a natural scene image as provided by the present invention can effectively solve problems concerning representations of elementary mathematical formulae in OCR recognition.

The method for structural analysis and recognition of a handwritten mathematical formula in a natural scene image according to the present invention comprises:

step S1: transforming a gray matrix of a natural scene image into a local contrast matrix, and performing a binary division to the obtained local contrast matrix using a Otsu threshold method, thereby obtaining a binary matrix;

step S2: performing a connected domain analysis to the binary matrix of step S1, and eliminating non-character connected domains to obtain character connected domains;

step S3: performing a detection of elements of a special structure of a formula to the character connected domains of step S2 using a correlation coefficient method, and separately annotating all the detected elements of the special structure;

step S4: dividing rows of the binary matrix of step S1 by means of horizontal projection;

step S5: recognizing each character connected domain by means of a convolutional neural network;

Step S6: defining an output sequence, and outputting the results of recognition in a corresponding sequence according to a typesetting format of LaTeX (a TeX-based typesetting system).

Preferably, a local contrast Con(i, j) of a point whose coordinate is (i, j) in the local contrast matrix is calculated by a formula of:

$$Con(i,j)=\alpha C(i,j)+(1-\alpha)(I_{max}(i,j)-I_{min}(i,j))$$

wherein, $I_{max}(i,j)$ and $I_{min}(i,j)$ are respectively the maximum gray value and the minimum gray value of a neighborhood centered at the point whose coordinate is (i, j) in the gray matrix of the image, and the radius of the neighborhood is set to be 5 herein;

$$\alpha = \left(\frac{Std}{128}\right)^{\gamma},$$

Std represents a standard deviation of the gray matrix, $\gamma=1$.

$$C(i,j) = \frac{I_{max}(i,j) - I_{min}(i,j)}{I_{max}(i,j) + I_{min}(i,j) + \varepsilon},$$

$\varepsilon$ is an infinitely small quantity to prevent the denominator from becoming 0.

Preferably, the method of performing binary division to the obtained local contrast matrix using the Otsu method is: acquiring a maximum value and a minimum value in the local contrast matrix, equally dividing the interval between the maximum value and the minimum value into n sub-intervals, and classifying each element to its corresponding sub-interval to form a histogram, then performing Otsu division based on said histogram, with points smaller than a selected threshold being background points and points greater than the selected threshold being character points.

Preferably, the method of performing a connected domain analysis to the binary matrix of step S1 and eliminating non-character connected domains to obtain character connected domains comprises:

step S201: obtaining a minimum enveloping rectangle of the connected domain, recording coordinates of four vertexes of said minimum enveloping rectangle, and calculating a length and height of the minimum enveloping rectangle;

step S202: calculating an average length and height of all connected domains; step S203: eliminating non-character connected domains;

if the length and height of a certain connected domain are smaller than ¼ of the average length and height respectively, then said connected domain will be considered as a noise point and will be eliminated;

if the length and height of a certain connected domain are greater than 4 times of the average length and height respectively, then said connected domain will be considered as a non-character portion of the image and will be eliminated;

step S204: saving the remaining connected domains as character connected domains.

Preferably, the elements of a special structure of a formula as mentioned in step S3 include braces, radicals and fractional lines;

a rule matching method is used to detect a fractional line connected domain: selecting a connected domain whose length-width ratio is greater than 5 and whose upper part and lower part need to have adjacent connected domains, and identifying said connected domain as a fractional line connected domain;

a template matching method is used to detect a brace connected domain and a radical connected domain:

step S301: selecting a standard binary template of the brace connected domain and the radical connected domain;

step S302: standardizing the size of the current connected domain so as to be the same as the standard template;

step S303: matching the standard binary template to the current connected domains respectively, wherein the formula for matching is a correlation coefficient formula, which is expressed as:

$$r = \frac{\sum_{i=1}^{n}(x_i - \bar{x})(y_i - \bar{y})}{\sqrt{\sum_{i=1}^{n}(x_i - \bar{x})^2 \cdot \sum_{i=1}^{n}(y_i - \bar{y})^2}}$$

wherein, $x_i$ and $y_i$ respectively represent values of the $i^{th}$ element in the current template and in the standard template, $\bar{x}$ and $\bar{y}$ respectively represent mean values of the current template and the standard template; $r \in (0,1)$, when r is greater than 0.5, the matching is successful.

Preferably, the method of dividing rows of the binary matrix by means of horizontal projection in step S4 includes:

obtaining a waveform after performing horizontal projection to the binary matrix of step S1, wherein a value of the X-coordinate of the waveform is the number of rows of the original image, and a value of the Y-coordinate thereof is the number of character points included in the current row;

extending to the left and right from each of the wave peaks of the waveform, and stopping the extension until the numerical value is smaller than 0.1 time of the wave peak value; if there is an overlapping between two adjacent wave peaks during the extension, their corresponding two rows are combined into one row;

recording a starting position and an ending position for each row, wherein the X-coordinate corresponding to the left end of the wave peak is a starting row coordinate of the current row, and the X-coordinate corresponding to the right end of the wave peak is an ending row coordinate of the current row.

Preferably, after obtaining information of the starting position and ending position for each row, each character connected domain is made to be corresponding to a row by: calculating a distance between a horizontal coordinate of a center of each character connected domain and a horizontal coordinate of a center of each text line, and classifying the character connected domain into the line with a minimum distance.

Preferably, the structure of the convolutional neural network in step S4 is a Lenet-5 structure, said convolutional neural network consists of an input layer, two convolutional and down-sampling layers, a fully connected hidden layer and an output layer; training data of the convolutional neural network are samples of the standardized character connected domains;

the character connected domain in step S2 is standardized and then input into the convolutional neural network to obtain a character corresponding to each character connected domain.

Preferably, the output sequence defined in step S6 includes three layers:

a first layer of sequential relationship is a row sequence relationship: character connected domains are output by lines according to the correspondence between the character connected domains and the rows;

a second layer of sequential relationship is a column sequence relationship: in each row, all character connected domains are ordered in an ascending manner according to column coordinates on the left thereof;

a third layer of sequential relationship is a sequential relationship in a special structure of the formula: elements in an equation set are output according to each equation; elements of a fraction are output in a pattern of numerator first and then denominator.

Preferably, for a sequential relationship in a special structure of a formula, character blocks included in each element of the special structure of the formula need to be determined;

as for a brace, it represents the special structure of an equation set, and it is necessary to determine a column coordinate of an end of the equation set so as to determine all character blocks included therein; character blocks are divided into the three parts of "upper", "middle" and "lower" according to the position of the current row in which the character blocks lie, all character blocks in the upper and lower parts are considered as elements of the equation set, and all such character blocks are found and an ending column of the rightmost character block is used as an ending column of the whole equation set; all character blocks in the brace and in the ending column of the equation set are classified into a current equation set structure; then rows inside the equation set structure are divided again to determine how many equations are included therein, and character blocks inside the equation set are output according to the sequence of equations;

as for a fractional line, it is necessary to determine all numerator and denominator elements of the current fraction, all character blocks whose starting longitudinal coordinate is greater than a starting longitudinal coordinate of the fractional line and whose ending longitudinal coordinate is smaller than an ending longitudinal coordinate of the fractional line will be classified into the current fraction structure; as for character blocks in the fraction structure, it is necessary to further determine whether they are numerators or denominators depending on the horizontal coordinates of the character blocks; if a horizontal coordinate of the bottom of a character block is smaller than a horizontal coordinate of the center of the fractional line, it belongs to numerator; if a horizontal coordinate of the top of a character block is greater than a horizontal coordinate of the center of the fractional line, it belongs to denominator;

as for a radical, it is necessary to determine character blocks inside the radical, wherein all character blocks whose starting longitudinal coordinate is greater than a starting longitudinal coordinate of the radical and whose ending longitudinal coordinate is smaller than an ending longitudinal coordinate of the radical will be classified into the current radical structure;

according to the above-described row sequence relationship, column sequence relationship and sequential relationship in the special structure of a formula, a final output of the formula structure is determined, and the output is conducted in a typesetting format of LaTeX (a TeX-based typesetting system).

The present invention effectively solves the problem concerning representation of elemental mathematical formulae in OCR recognition and realizes accurate recognition of formulae.

DETAILED DESCRIPTION OF THE INVENTION

The method for structural analysis and recognition of a handwritten mathematical formula in a natural scene as provided in an embodiment of the present invention will be described in detail below with reference to the drawings.

Figure 1:
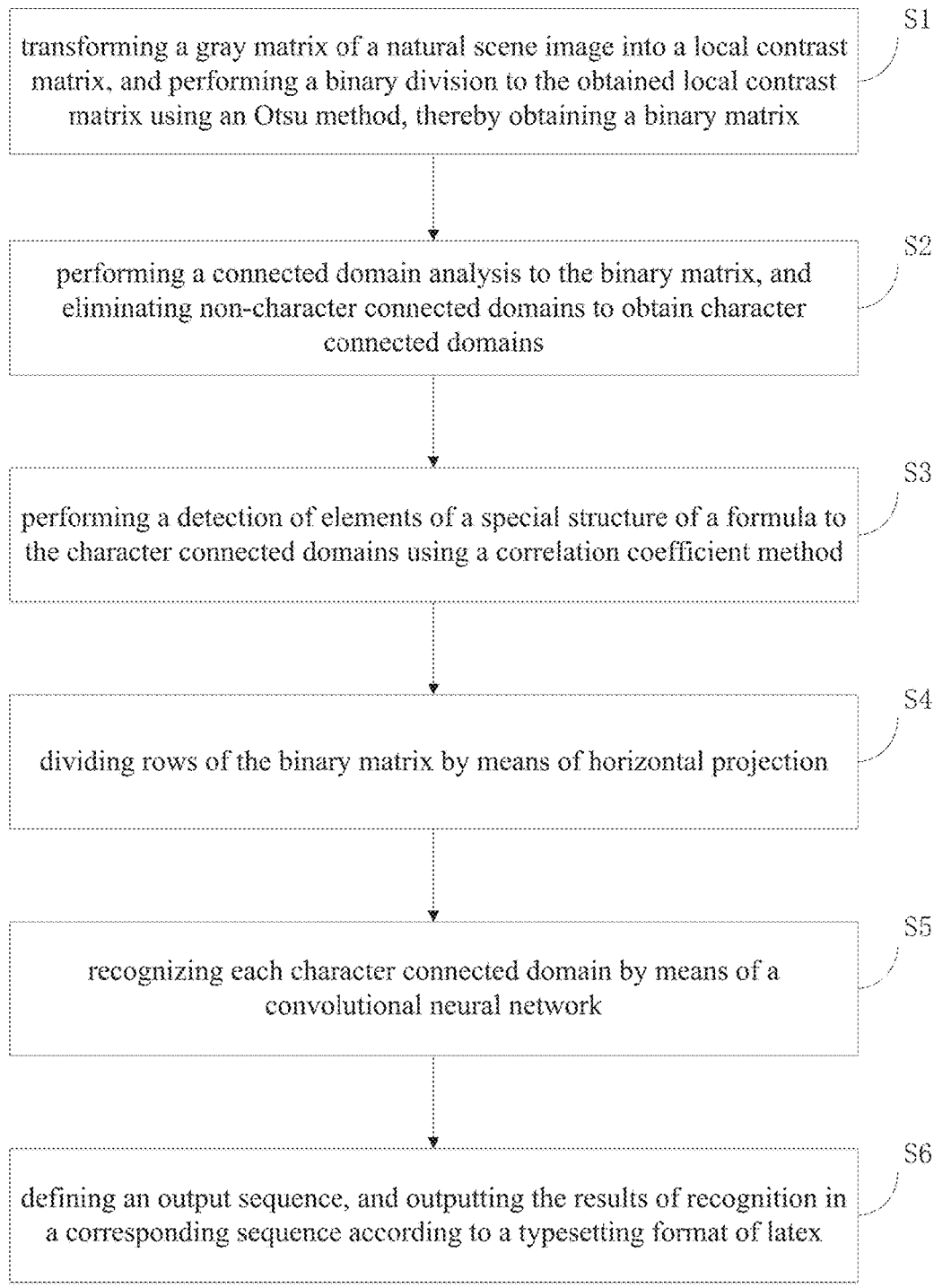
FIG. 1 is a flow chart of a method for structural analysis and recognition of a handwritten mathematical formula in a natural scene as provided in an embodiment of the present invention.

As shown in FIG. 1, the method for structural analysis and recognition of a handwritten mathematical formula in a natural scene as provided in an embodiment of the present invention comprises the following steps:

step S1: transforming a gray matrix of a natural scene image into a local contrast matrix, and performing a binary division to the obtained local contrast matrix using an Otsu method, thereby obtaining a binary matrix;

in this embodiment, a local contrast Con(i, j) of a point whose coordinate is (i, j) in the local contrast matrix is calculated by the formula of:

$$Con(i,j)=\alpha C(i,j)+(1-\alpha)(1_{max}(i,j)-I_{min}(j))$$

wherein, $I_{max}(i,j)$ and $I_{min}(i,j)$ are respectively the maximum gray value and the minimum gray value of a neighborhood centered at the point whose coordinate is (i, j) in the gray matrix of the image, and the radius of the neighborhood is set to be 5 herein;

$$\alpha = \left(\frac{Std}{128}\right)^{\gamma},$$

Std represents a standard deviation of the gray matrix, $\gamma=1$.

$$C(i, j) = \frac{I_{max}(i, j) - I_{min}(i, j)}{I_{max}(i, j) + I_{min}(i, j) + \varepsilon},$$

$\varepsilon$ is an infinitely small quantity to prevent the denominator from becoming 0.

The method of performing binary division to the obtained local contrast matrix using the Otsu method in this embodiment is: acquiring a maximum value and a minimum value in the local contrast matrix, equally dividing the interval between the maximum value and the minimum value into 1000 sub-intervals, and classifying each element into its corresponding sub-interval to form a statistical histogram having a length of 1000, then performing binary division to said histogram using the Otsu method, with points smaller than a selected threshold being background points and points greater than the selected threshold being character points.

Step S2: performing a connected domain analysis to the binary matrix of step S1, eliminating non-character connected domains to obtain character connected domains, specifically:

step S201: obtaining a minimum enveloping rectangle of the connected domain, recording coordinates of four vertexes of said minimum enveloping rectangle, and calculating a length and height of the minimum enveloping rectangle;

step S202: calculating an average length and height of all connected domains;

step S203: eliminating non-character connected domains:

if the length and height of a certain connected domain are smaller than ¼ of the average length and height respectively, then said connected domain will be considered as a noise point and will be eliminated;

if the length and height of a certain connected domain are greater than 4 times of the average length and height respectively, then said connected domain will be considered as a non-character portion of the image and will be eliminated;

step S204: saving the remaining connected domains as character connected domains, and obtaining character blocks of the character connected domains according to the minimum enveloping rectangle.

Step S3: performing a detection of elements of a special structure of a formula to the character connected domains of step S2 using a correlation coefficient method, and separately annotating all the detected elements of the special structure:

the elements of a special structure of a formula in this embodiment include braces, radicals and fractional lines;

a rule matching method is used to detect a fractional line connected domain: selecting a connected domain whose length-width ratio is greater than 5 and whose upper part and lower part need to have adjacent connected domains, and identifying said connected domain as a fractional line connected domain;

a template matching method is used to detect a brace connected domain and a radical connected domain, wherein a standard template adopts a matrix of 32*32, character blocks of character connected domains to be detected need to be standardized into a matrix of 32*32, too, and a correlation coefficient of said two matrixes is calculated, if it is greater than 0.5, then the matching is successful, and the specific steps are as follows:

step S301: selecting a standard binary template of the brace connected domain and radical connected domain;

step S302: standardizing the size of the current connected domain so as to be the same as the standard template;

step S303: matching the standard binary template to the current connected domains respectively, wherein the formula for matching is a correlation coefficient formula, which is expressed as:

$$r = \frac{\sum\limits_{i=1}^{n}(x_i - \bar{x})(y_i - \bar{y})}{\sqrt{\sum\limits_{i=1}^{n}(x_i - \bar{x})^2 \cdot \sum\limits_{i=1}^{n}(y_i - \bar{y})^2}}$$

wherein, $x_i$ and $y_i$ respectively represent values of the $i^{th}$ element in the current template and in the standard template, $\bar{x}$ and $\bar{y}$ respectively represent mean values of the current template and the standard template; $r \in (0,1)$ when r is greater than 0.5, the matching is successful.

All the detected special structure elements are annotated separately to perform subsequent structural analysis.

Step S4: dividing rows of the binary matrix of step S1 by means of horizontal projection;

obtaining a waveform after performing horizontal projection to the binary matrix of step S1, wherein a value of the X-coordinate of the waveform is the number of rows of the original image, and a value of the Y-coordinate thereof is the number of character points included in the current row, and row information is obtained based on wave peaks;

it is specified that a distance between adjacent wave peaks must be greater than 10, as for two wave peaks whose distance is smaller than 10, only the one with a higher peak value is retained, and it is also specified that a height of the wave peak should be at least greater than 1/20 of a length of the image;

extending simultaneously to the left and right from a wave peak satisfying the above-mentioned conditions, and stopping the extension until the numerical value is smaller than 0.01 time of the wave peak height, extending to the left and right from each of the wave peaks of the waveform, and stopping the extension until the numerical value is smaller than 0.1 time of the wave peak value; if there is an overlapping between two adjacent wave peaks during the extension, their corresponding two rows are combined into one row;

recording a starting position and an ending position for each row, wherein the X-coordinate corresponding to the left end of the wave peak is a starting row coordinate of the current row, and the X-coordinate corresponding to the right end of the wave peak is an ending row coordinate of the current row.

After obtaining information of the starting position and ending position for each row, each character connected domain is made to be corresponding to a row, and the specific method is: calculating a distance between a horizontal coordinate of a center of each character connected domain and a horizontal coordinate of a center of each text line and classifying the character connected domain into the row with a minimum distance.

An equation set might sometimes be mistakenly divided into multiple rows, so it is specified that the row in which a brace lies is not allowed to be divided into multiple rows.

Figure 2:
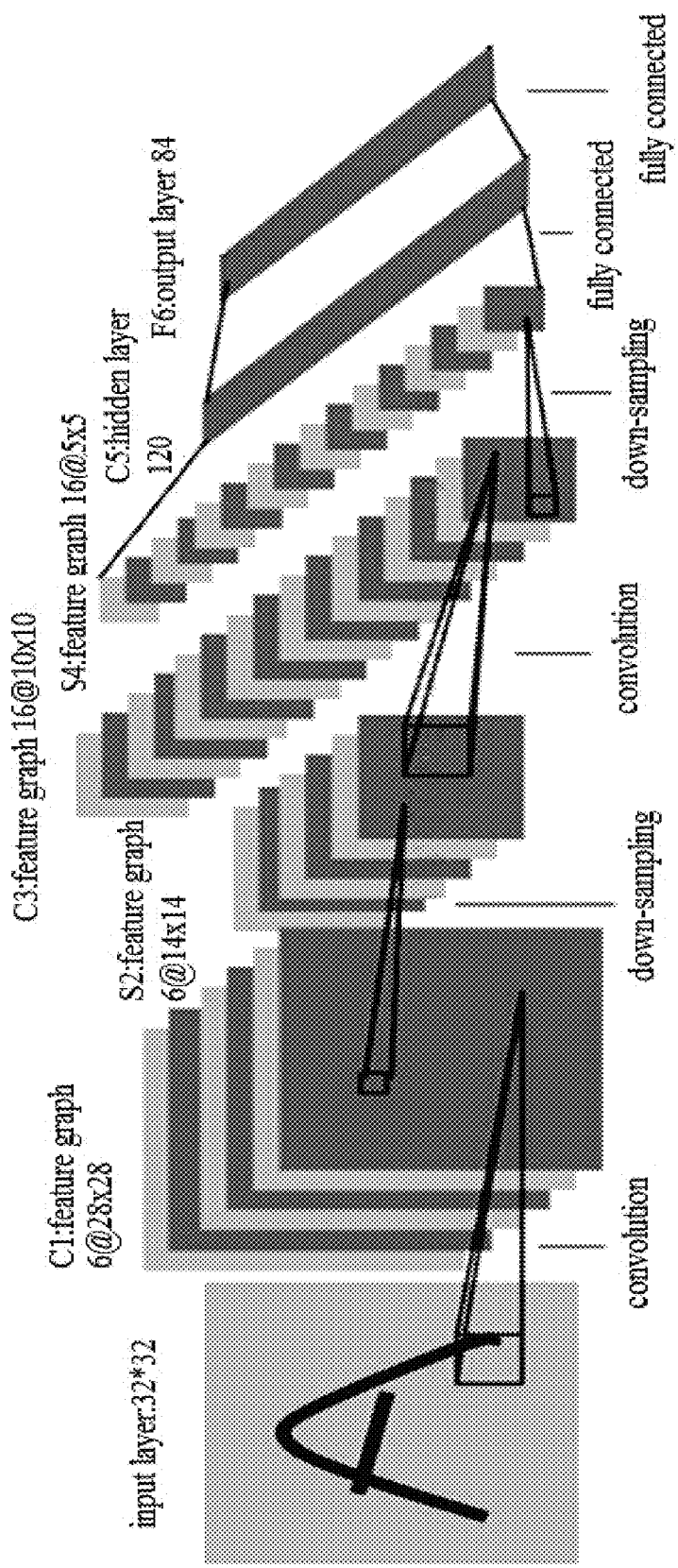
FIG. 2 is a schematic drawing of the structure of a convolutional neural network adopted in the present invention for implementing character recognition.

Step S5: recognizing each character connected domain by means of a convolutional neural network;

as shown in FIG. 2, the structure of the convolutional neural network is a Lenet-5 structure, said convolutional neural network consists of an input layer, two convolutional and down-sampling layers, a fully connected hidden layer and an output layer;

a sample of the input layer has a size of 32*32, a first convolutional layer has 6 feature graphs, a second convolutional layer has 16 feature graphs, the down-sampling layer adopts a way of maximum value output, the numbers of rows and columns become half of the original, the hidden layer has 120 nodes, and the output layer has 84 nodes;

a training sample is a sample of the standardized character connected domain, which is obtained by the above-mentioned binaryzation method, that is, the training sample and a predicting sample are obtained in the same way and normalized in the same way so as to increase accuracy rate of recognition.

The character connected domain in step S2 is standardized and then input into the convolutional neural network to obtain a character corresponding to each character connected domain.

Step S6: defining an output sequence, and outputting the results of recognition in a corresponding sequence according to a typesetting format of LaTeX;

the defined output sequence includes three layers:

a first layer of sequential relationship is a row sequence relationship: character connected domains are output by lines according to the correspondence between the character connected domains and the rows;

a second layer of sequential relationship is a column sequence relationship: in each row, all character connected domains are ordered in an ascending manner according to column coordinates on the left thereof;

a third layer of sequential relationship is a sequential relationship in a special structure of the formula: elements in an equation set are output according to each equation;

elements of a fraction are output in a pattern of numerator first and then denominator.

For a sequential relationship in a special structure of a formula, character blocks included in each element of the special structure of the formula need to be determined;

as for a brace, it represents the special structure of an equation set, and it is necessary to determine a column coordinate of an end of the equation set so as to determine all character blocks included therein; character blocks are divided into the three parts of "upper", "middle" and "lower" according to the position of the current row in which the character blocks lie, all character blocks in the upper and lower parts are considered as elements of the equation set, and all such character blocks are found and an ending column of the rightmost character block is used as an ending column of the whole equation set; all character blocks in the brace and in the ending column of the equation set are classified into a current equation set structure; then rows inside the equation set structure are divided again to determine how many equations are included therein, and character blocks inside the equation set are output according to the sequence of equations;

as for a fractional line, it is necessary to determine all numerator and denominator elements of the current fraction, and all character blocks whose starting longitudinal coordinate is greater than a starting longitudinal coordinate of the fractional line and whose ending longitudinal coordinate is smaller than an ending longitudinal coordinate of the fractional line will be classified into the current fraction structure; as for character blocks in the fraction structure, it is necessary to further determine whether they are numerators or denominators depending on the horizontal coordinates of the character blocks; if a horizontal coordinate of the bottom of a character block is smaller than a horizontal coordinate of the center of the fractional line, it belongs to numerator; if a horizontal coordinate of the top of a character block is greater than a horizontal coordinate of the center of the fractional line, it belongs to denominator;

as for a radical, it is necessary to determine character blocks inside the radical, and all character blocks whose starting longitudinal coordinate is greater than a starting longitudinal coordinate of the radical and whose ending longitudinal coordinate is smaller than an ending longitudinal coordinate of the radical will be classified into the current radical structure;

according to the above-described row sequence relationship, column sequence relationship and sequential relationship in the special structure of a formula, a final output of the formula structure is determined, and the output is conducted in a typesetting format of LaTeX.

The above embodiments can effectively solve the problem concerning representation of elemental mathematical formulae in OCR recognition and realize accurate recognition of formulae.

The above described are merely preferred embodiments of the present invention, which do not intend to limit the present invention. To those skilled in the art, various changes and modifications can be made to the invention. Therefore, any modification, equivalent substitution and improvement made within the spirit and principle of the present invention shall fall within the protection scope of the present invention.

What is claimed is:

1. A method for structural analysis and recognition of a handwritten mathematical formula in a natural scene image, comprising:

step S1: transforming a gray matrix of a natural scene image into a local contrast matrix, and performing a binary division to the obtained local contrast matrix using an Otsu method, thereby obtaining a binary matrix;

step S2: performing a connected domain analysis to the binary matrix of step S1, and eliminating non-character connected domains to obtain character connected domains;

step S3: performing a detection of elements of a structure of a formula to the character connected domains of step S2 using a correlation coefficient method, and separately annotating all the detected elements of the structure;

step S4: dividing rows of the binary matrix of step S1 by means of horizontal projection;

step S5: recognizing each character connected domain by means of a convolutional neural network; and step S6: defining an output sequence, and outputting results of recognition in a corresponding sequence according to a typesetting format of LaTeX.

2. The method according to claim 1, wherein a local contrast $Con(i,j)$ of a point whose coordinate is $(i,j)$ in the local contrast matrix is calculated by a formula of:

$$Con(i,j) = \alpha C(i,j) + (1-\alpha)(I_{max}(i,j) - I_{min}(i,j))$$

wherein, $I_{max}(i,j)$ and $I_{min}(i,j)$ are respectively a maximum gray value and a minimum gray value of a neighborhood centered at the point whose coordinate is $(i,j)$ in the gray matrix of the image, and a radius of the neighborhood is set to be 5 herein;

$$\alpha = \left(\frac{Std}{128}\right)^{\gamma},$$

Std represents a standard deviation of the gray matrix, $\gamma = 1$; and $$C(i,j) = \frac{I_{max}(i,j) - I_{min}(i,j)}{I_{max}(i,j) + I_{min}(i,j) + \varepsilon},$$

$\varepsilon$ is an infinitely small quantity to prevent the denominator from becoming 0.

3. The method according to claim 2, wherein the method of performing binary division to the obtained local contrast matrix using the Otsu method comprises:

acquiring a maximum value and a minimum value in the local contrast matrix, equally dividing the interval between the maximum value and the minimum value into n sub-intervals, and classifying each element to its corresponding sub-interval to form a histogram, then performing Otsu division based on said histogram, with points smaller than a selected threshold being background points and points greater than the selected threshold being character points.

4. The method according to claim 3, wherein the method of performing a connected domain analysis to the binary matrix of step S1 and eliminating non-character connected domains to obtain character connected domains comprises:

step S201: obtaining a minimum enveloping rectangle of the connected domain, recording coordinates of four vertexes of said minimum enveloping rectangle, and calculating a length and height of the minimum enveloping rectangle;

step S202: calculating an average length and height of all connected domains;

step S203: eliminating non-character connected domains:

if the length and height of a certain connected domain are smaller than ¼ of the average length and height respectively, then the certain connected domain is considered as a noise point and is eliminated;

if the length and height of the certain connected domain are greater than 4 times of the average length and height respectively, then the certain connected domain is considered as a non-character portion of the image and is eliminated; and step S204: saving the remaining connected domains as character connected domains.

5. The method according to claim 4, wherein the elements of the structure of the formula as mentioned in step S3 include braces, radicals and fractional lines;

a rule matching method is used to detect a fractional line connected domain: selecting a connected domain whose length-width ratio is greater than 5 and whose upper part and lower part have adjacent connected domains, and identifying said connected domain whose length-width ratio is greater than 5 as a fractional line connected domain;

a template matching method is used to detect a brace connected domain and a radical connected domain:

step S301: selecting a standard binary template for the brace connected domain and the radical connected domain;

step S302: standardizing the size of a current connected domain so as to be the same as the standard template; and step S303: matching the standard binary template to current connected domains respectively, wherein the formula for matching is a correlation coefficient formula, which is expressed as:

$$r = \frac{\sum_{i=1}^{n}(x_i - \bar{x})(y_i - \bar{y})}{\sqrt{\sum_{i=1}^{n}(x_i - \bar{x})^2 \cdot \sum_{i=1}^{n}(y_i - \bar{y})^2}}$$

wherein, $x_i$ and $y_i$ respectively represent values of the $i^{th}$ element in a current template and in the standard template, $\bar{x}$ and $\bar{y}$ respectively represent mean values of the current template and the standard template; $r \in (0,1)$, when $r$ is greater than 0.5, the matching is successful.

6. The method according to claim 5, wherein the method of dividing rows of the binary matrix by means of horizontal projection in step S4 includes:

obtaining a waveform after performing horizontal projection to the binary matrix of step S1, wherein a value of the X-coordinate of the waveform is the number of rows of the original image, and a value of the Y-coordinate thereof is the number of character points included in a current row;

extending to the left and right from each of the wave peaks of the waveform, and stopping the extension until the numerical value is smaller than 0.1 time of the wave peak value; if there is an overlapping between two adjacent wave peaks during the extension, their corresponding two rows are combined into one row; and recording a starting position and an ending position for each row, wherein the X-coordinate corresponding to the left end of the wave peak is a starting row coordinate of the current row, and the X-coordinate corresponding to the right end of the wave peak is an ending row coordinate of the current row.

7. The method according to claim 6, wherein after obtaining information of the starting position and ending position for each row, each character connected domain is made to be corresponding to a row by:

calculating a distance between a horizontal coordinate of a center of each character connected domain and a horizontal coordinate of a center of each text line, and classifying the character connected domain into the line with a minimum distance.

8. The method according to claim 7, wherein the structure of the convolutional neural network in step S4 is a Lenet-5 structure, said convolutional neural network consists of an input layer, two convolutional and down-sampling layers, a fully connected hidden layer and an output layer;

training data of the convolutional neural network are samples of the standardized character connected domains; and the character connected domain in step S2 is standardized and then input into the convolutional neural network to obtain a character corresponding to each character connected domain.

9. The method according to claim 8, wherein the output sequence defined in step S6 includes three layers:

a first layer of sequential relationship is a row sequence relationship: character connected domains are output by lines according to the correspondence between the character connected domains and the rows;

a second layer of sequential relationship is a column sequence relationship: in each row, all character connected domains are ordered in an ascending manner according to column coordinates on the left thereof; and a third layer of sequential relationship is a sequential relationship in the structure of the formula: elements in an equation set are output according to each equation; elements of a fraction are output in a pattern of numerator first and then denominator.

10. The method according to claim 9, wherein for a sequential relationship in the structure of the formula, character blocks included in each element of the structure of the formula are determined;

as for a brace, it represents a structure of an equation set, and a column coordinate of an end of the equation set is determined so as to determine all character blocks included therein; character blocks are divided into the three parts of "upper", "middle" and "lower" according to the position of a current row in which the character blocks lie, all character blocks in the upper and lower parts are considered as elements of the equation set, and all such character blocks are found and an ending column of the rightmost character block is used as an ending column of the whole equation set; all character blocks in the brace and in the ending column of the equation set are classified into a current equation set structure; then rows inside the equation set structure are divided again to determine how many equations are included therein, and character blocks inside the equation set are output according to the sequence of equations;

as for a fractional line, all numerator and denominator elements of a current fraction are determined, and all character blocks whose starting longitudinal coordinate is greater than a starting longitudinal coordinate of the fractional line and whose ending longitudinal coordinate is smaller than an ending longitudinal coordinate of the fractional line are classified into a current fraction structure; as for character blocks in the fraction structure, further determine whether the character blocks in the fraction structure are numerators or denominators depending on the horizontal coordinates of the character blocks; if a horizontal coordinate of a bottom of a character block is smaller than a horizontal coordinate of the center of the fractional line, it belongs to numerator; if a horizontal coordinate of a top of a character block is greater than a horizontal coordinate of the center of the fractional line, it belongs to denominator; and as for a radical, determine character blocks inside the radical, wherein all character blocks whose starting longitudinal coordinate is greater than a starting longitudinal coordinate of the radical and whose ending longitudinal coordinate is smaller than an ending longitudinal coordinate of the radical are classified into a current radical structure; according to the above-described row sequence relationship, column sequence relationship and sequential relationship in the structure of the formula, a final output of the formula structure is determined, and the output is conducted in a typesetting format of LaTeX.

* * * * *